United States Patent [19]

Ekins

[11] Patent Number: 4,895,044
[45] Date of Patent: Jan. 23, 1990

[54] HAND GRIP FOR CYCLE HANDLES

[75] Inventor: David L. Ekins, Calabasas, Calif.

[73] Assignee: Aero Toys, Incorporated, Reseda, Calif.

[21] Appl. No.: 313,709

[22] Filed: Feb. 22, 1989

[51] Int. Cl.$^4$ .............................................. B62K 21/26
[52] U.S. Cl. ................................ 74/551.9; 16/110 R; 273/81 R; 273/81 B; D8/303
[58] Field of Search .................... 74/551.1–551.9, 74/488, 489; 81/177.1, 177.6; 16/110 R, 122, DIG. 12; 273/81 R, 81 B, 81 D; D8/303; 29/235; 280/821

[56] References Cited

U.S. PATENT DOCUMENTS

| | | | |
|---|---|---|---|
| 366,775 | 7/1887 | Jeffery | 74/551.9 X |
| 3,205,729 | 9/1965 | Golden | 74/551.9 |
| 3,879,048 | 4/1975 | Penney | 273/81 D X |
| 3,880,443 | 4/1975 | Tobin | 273/81 D X |
| 4,031,775 | 6/1977 | Petty | 74/551.9 |
| 4,191,065 | 3/1980 | Golobay et al. | 74/489 |
| 4,232,565 | 11/1980 | Leonheart | 74/489 |
| 4,308,762 | 1/1982 | Jannard | 74/551.9 |
| 4,381,579 | 5/1983 | Rumpp | 74/551.9 |

FOREIGN PATENT DOCUMENTS

| | | | |
|---|---|---|---|
| 507737 | 12/1951 | Belgium | 74/489 |
| 499396 | 3/1929 | Fed. Rep. of Germany | 74/551.9 |
| 645139 | 4/1937 | Fed. Rep. of Germany | 74/489 |
| 1112170 | 3/1956 | France | 16/110 R |
| 1221709 | 6/1960 | France | 74/551.9 |
| 7611775 | 4/1978 | Netherlands | 74/551.9 |
| 131606 | 3/1951 | Sweden | 74/489 |
| 291089 | 9/1953 | Switzerland | 74/489 |
| 485659 | 5/1938 | United Kingdom | 273/81 R |
| 630295 | 10/1949 | United Kingdom | 273/81 R |

Primary Examiner—Vinh Luong
Attorney, Agent, or Firm—Donald D. Mon

[57] ABSTRACT

A tubular hand grip fits on and over the end of the cycle handle. It has a peripheral outer surface that is grasped by the hand. An external flange is located adjacent to an end of the grip to limit the axial movement of the hand. A blade projects from the outer surface, and extends as a fragment of a helix toward the flange, increasing in lateral dimension as it goes. It preferably terminates at a gap in the flange. The thumb can be laid against the blade in a comfortable position to be stabilized and located there. The grip is preferably so proportioned that the first finger of the hand can be brought against the other side of the blade so the thumb and first finger exert an efficient gripping action that requires only minimal physical effort.

5 Claims, 1 Drawing Sheet

HAND GRIP FOR CYCLE HANDLES

FIELD OF THE INVENTION

A hand grip to be fitted to a motorcycle handle or a bicycle handle.

BACKGROUND OF THE INVENTION

While riding a cycle, either engine powered or pedal powered, the rider controls the direction of travel by holding the handle and turning it around a steering post to steer the wheel. On powered vehicles, the engine and sometimes the brake also, is controlled by rotating an attachment on the handle. It is customary to provide hand grips on the handles to improve the rider's control or feel of control. Known grips for this purpose frequently have such expedients as grooves in which the fingers fit, and tacky grip surfaces.

A problem with conventional hand grips is that they are usually rather symmetrical, and there is no point of reference on the grip itself. The rider can grasp it in a large number of rotary positions, and there is a unique position between the hand and the grip. It would be better if an alignment could, for example, be related to an engine control setting as well as to the rider's hand position when the control is in that setting. It is an object of this invention to provide such an advantage.

Still further, the rider's grasp on conventional grips is only as strong as his manual squeeze strength. A motocross rider, for example, has many things to consider and physical reactions to make at once. Any means to reduce his grip effort is at least a help to the rider. This invention makes available the additional grip attainable directly between the opposed thumb and first finger.

BRIEF DESCRIPTION OF THE INVENTION

This invention is a tubular hand grip that fits on and over the end of a cycle handle. It has a peripheral outer surface that is grasped by the hand. An external flange is located adjacent to an end of the grip to limit the axial movement of the hand. A blade projects from the outer surface, and extends as a fragment of a helix toward the flange, increasing in lateral dimension as it goes. It preferably terminates at a gap in the flange.

The thumb can be laid against the blade in a comfortable position to be stabilized and located there. The grip is preferably so proportioned that the first finger of the hand can be brought against the other side of the blade so the thumb and first finger exert an efficient gripping action that requires only minimal physical effort.

The above and other features of this invention will be fully understood from the following detailed description and the accompanying drawings, in which:

DETAILED DESCRIPTION OF THE INVENTION

Figure 1:
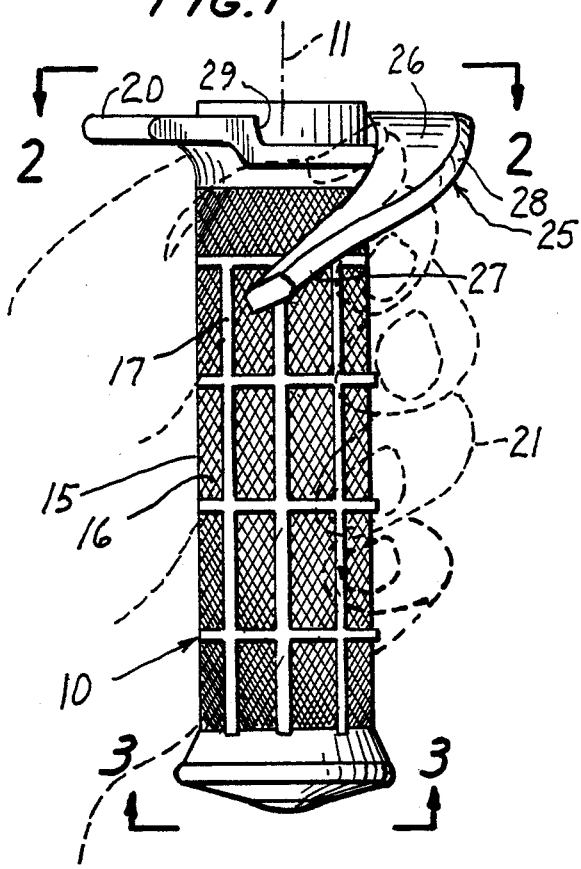
FIG. 1 is a side view of the presently-preferred embodiment of the invention.
Figure 4:
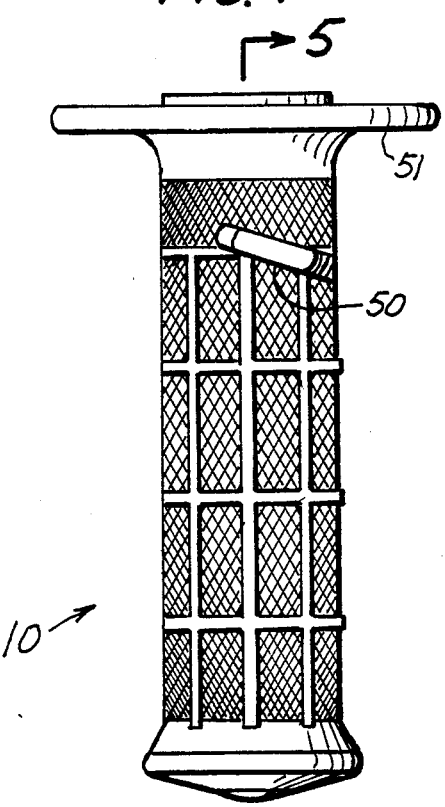
FIG. 4 is a side view of a modification of the invention.
Figure 2:
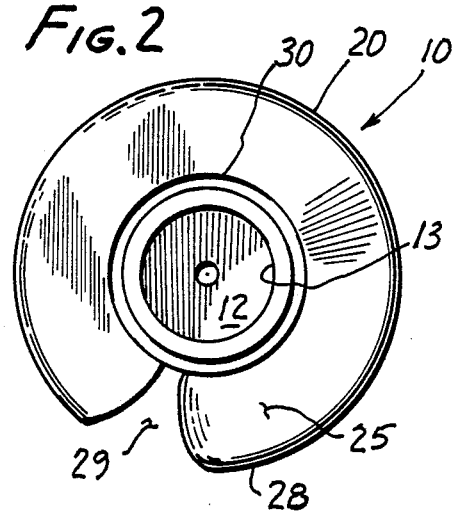
FIG. 2 is a top view of FIG. 1.
Figure 3:
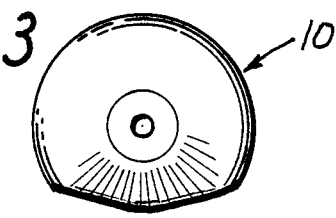
FIG. 3 is a bottom view of FIG. 1.

A hand grip 10 according to the invention is intended to be fitted onto and over the end of a cycle handle, or onto and over some attachment to the handle such as a rotatable throttle or brake control. The grip is a unitary cast body of a flexible, somewhat elastic material. Conventional rubber compositions or relatively soft organic plastic materials are suitable.

The body has an axis 11 of length. An internal passage 12 (such as that shown in FIG. 5) has a wall 13 that fits on the handle with a sufficient hold that it does not slip axially or rotatably.

A peripheral outer surface 15 is generally cylindrical, but modified with knurls 16 and ribs 17 as desired to improve the rider's hold on the grip.

An external flange 20 extends as a disc-like structure most of the way around the grip. It provides a limit means to prevent the hand 21 from moving past it, and thereby assists in locating the hand.

A blade 25 projects from the outer surface. It extends in a helical manner for about 45% of the periphery. The blade has two sides 26, 27 and an edge 28. The edge increases in lateral dimension from its intersection with the outer surface. In the preferred embodiment of FIG. 1 it connects with the flange. Sides 26 and 27 are generally parallel to one another. The edge is preferably gently rounded.

In this embodiment, a gap 29 is formed in the flange adjacent to side 26 to pass the thumb. The thumb can be laid against side 26, and this assists in locating the thumb and the hand.

When the grip is optimally positioned, the first finger of the hand can be brought against side 27. Now the blade can be strongly held by a squeeze between the opposed thumb and first finger. This rotationally locates the hand and the grip. The additional squeeze and retention by the thumb and the first finger is additive to that of merely gripping the grip with the fingers wrapped around it. The total force of these two efforts is therefore increased, or if desired, less force by each could be exerted, still providing an adequate grip. At the same time, the hand is uniquely located relative to the grip.

When both handles are to be provided with these features, one grip would be the mirror image of the other. For some installations, only one handle will be required with this feature, in which event the appropriately handed grip will be provided.

A peripheral relief 30 is advantageously formed in one end of the grip adjacent to the flange. It is groove-like and enables a readier flexure of the flange.

Figure 5:
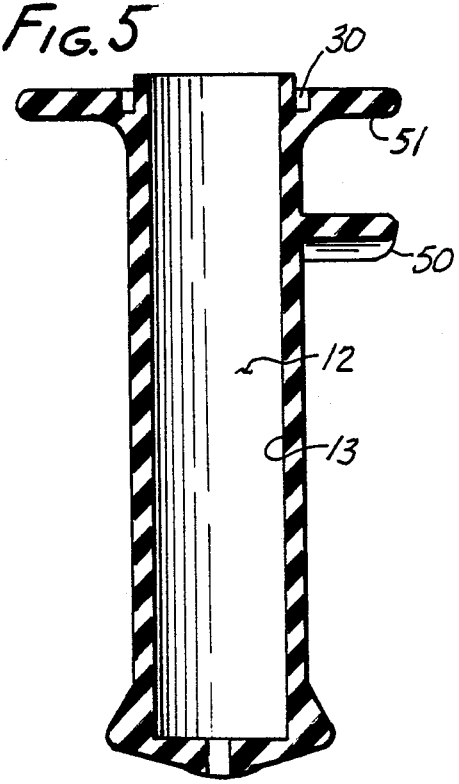
FIG. 5 is a cross section taken at line 5—5 in FIG. 4.

FIG. 5 shows that a helical blade 50 need not intersect flange 51 at the end of grip 52. Flange 51 need not have a gap. Instead it extends only a short axial length. The thumb will not pass through the flange, and flange 51 will be less effective in positioning the hand. However, there may be some applications where the placement of the blade against the web of the thumb will be adequate for both axial and rotational alignment. The advantage of the squeeze between the thumb and the first finger is still provided.

This invention is not to be limited by the embodiment shown in the drawings and described in the description, which is given by way of example and not of limitation, but only in accordance with the scope of the appended claims.

I claim:

1. In a hand grip for the handle of a cycle, said hand grip comprising a hollow body having an axis, an internal passage defined by a peripheral wall so disposed and arranged as to fit over and upon the end of a cycle handle, and a peripheral outer surface on said body to be grasped by the hand, the improvement comprising:

an external lateral flange on the body adjacent to one end thereof, projecting radially beyond the outer surface to limit axial movement of the hand; a blade projecting from and extending as a fragment of a helix, helically along said outer surface toward said flange to provide a thumb rest, there being a gap in the flange to pass the thumb, whereby the hand while gripping the grip is stabilized axially, and the hand is positioned and stabilized rotationally by gripping the blade between the thumb and first finger, the thumb being laid against the blade.

2. A hand grip according to claim 1 in which said flange is formed as a disc, with a cut-out portion to form said gap, said blade having a sheet-like form on both of its sides and an edge which gradually rises from the outer surface to the outside dimension of the flange.

3. A hand grip according to claim 2 in which said body is a continuous unitary cast structure, made of a flexible, elastic material.

4. A hand grip according to claim 2 in which a peripheral relief is formed between the inner edge of the flange adjacent to the blade to facilitate the limited flexure of the flange and of the blade.

5. A hand grip according to claim 4 in which axially extending ribs are formed on said outer surface to facilitate gripping the same.

* * * * *